(12) United States Patent  (10) Patent No.: US 6,736,134 B2
Marko                      (45) Date of Patent:    May 18, 2004

(54) THIN WALL HEADER FOR USE IN MOLTEN SALT SOLAR ABSORPTION PANELS

(75) Inventor: Myroslaw Marko, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/946,804

(22) Filed: Sep. 5, 2001

(65) Prior Publication Data

US 2003/0041857 A1 Mar. 6, 2003

(51) Int. Cl.[7] ................................. F24J 2/02
(52) U.S. Cl. .................. 126/680; 126/651; 165/175
(58) Field of Search ......................... 126/651, 175, 126/680, 684, 690, 696, 691, 578, 685; 359/853, 870, 883, 848; 60/641.8, 641.15, 659; 165/905; 29/890.05; 122/510

(56) References Cited

U.S. PATENT DOCUMENTS

| 3,721,531 A | * | 3/1973 | Tuncer ........................ 422/197 |
| 4,321,911 A | | 3/1982 | Offutt |
| 4,387,704 A | * | 6/1983 | Minden ....................... 126/572 |
| 4,466,239 A | * | 8/1984 | Napoli et al. ................. 60/782 |
| 4,676,305 A | * | 6/1987 | Doty ............................ 165/158 |
| 4,765,956 A | | 8/1988 | Smith et al. |
| 5,269,137 A | * | 12/1993 | Edwards, III ................. 60/766 |
| 5,275,148 A | * | 1/1994 | Ranyak ....................... 126/674 |
| 5,599,383 A | * | 2/1997 | Dyer et al. ...................... 96/8 |
| 5,685,151 A | * | 11/1997 | Ross ........................ 60/641.15 |
| 5,850,831 A | * | 12/1998 | Marko ......................... 126/645 |
| 5,862,800 A | * | 1/1999 | Marko ......................... 126/651 |
| 6,026,804 A | * | 2/2000 | Schardt et al. ............... 126/344 |
| 6,038,768 A | * | 3/2000 | Rhodes ................... 29/890.033 |
| 6,141,949 A | * | 11/2000 | Steinmann ............... 60/39.182 |
| 6,196,216 B1 | * | 3/2001 | Kooij ........................... 126/621 |
| 6,282,895 B1 | * | 9/2001 | Johansson et al. ............ 60/524 |
| 6,336,452 B1 | * | 1/2002 | Tirey, Jr. ..................... 126/578 |

OTHER PUBLICATIONS

PCT International application WO 83/03891 May 3, 1983.

* cited by examiner

Primary Examiner—Henry Bennett
Assistant Examiner—Kathryn Odland
(74) Attorney, Agent, or Firm—Harness Dickey & Pierce P.L.C.

(57) ABSTRACT

This invention provides a thin wall header fabricated from a nickel-base superalloy, UNS N06626, for the solar absorption panels in a molten nitrate salt solar central receiver. The thin wall header is obtained by using multiple flow distribution nozzles to yield the smallest diameter header having uniform flow distribution for the panel tubes while providing enough space to butt weld the tubes to the nozzles with an automatic orbital weld head and avoid overlapment of the nozzle reinforcement regions. This small diameter combined with the high allowable tensile stress of UNS N06626 results in a thin wall header. The thin wall small diameter UNS N06626 header with its low thermal expansion coefficient and small temperature gradients and differentials during cloud cover induced molten salt temperature transients yields low thermal strains in the tube nozzle to header region. The nozzles may be formed by direct extrusion from the header wall or by insert-welding a machined nozzle into the header wall. Either construction, combined with the materials excellent thermal strain fatigue resistance eliminates the need to furnish costly and complex thermal protection devices for this region.

13 Claims, 3 Drawing Sheets

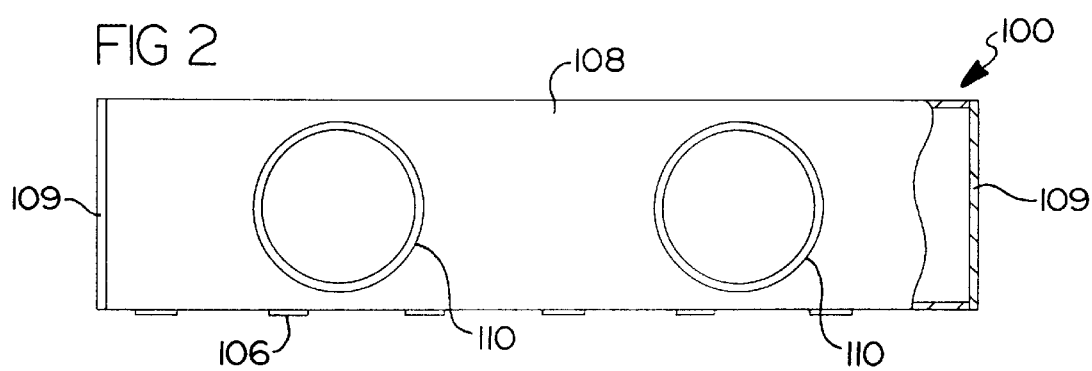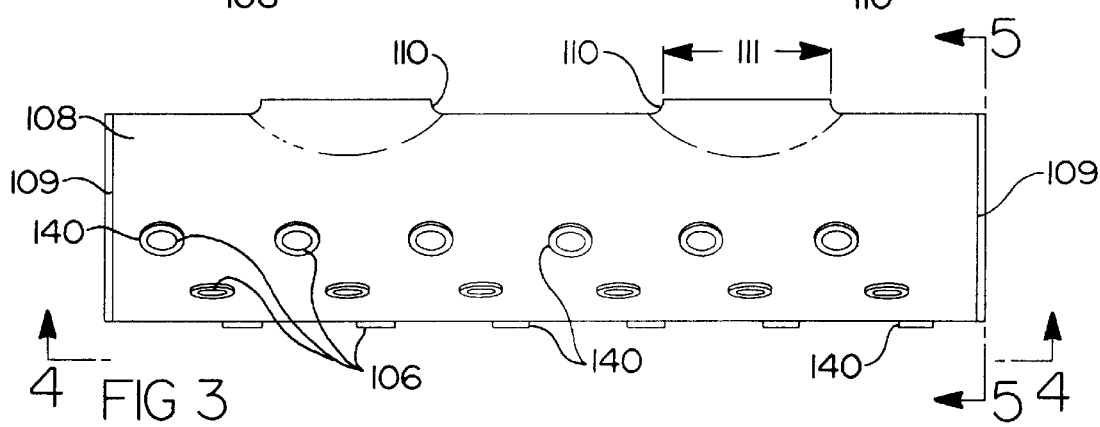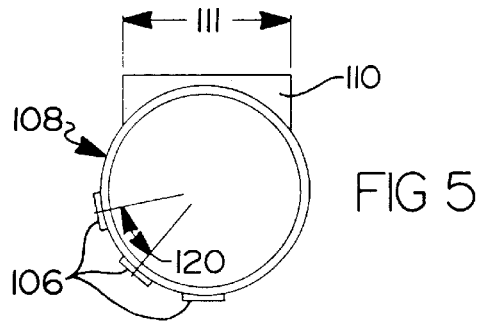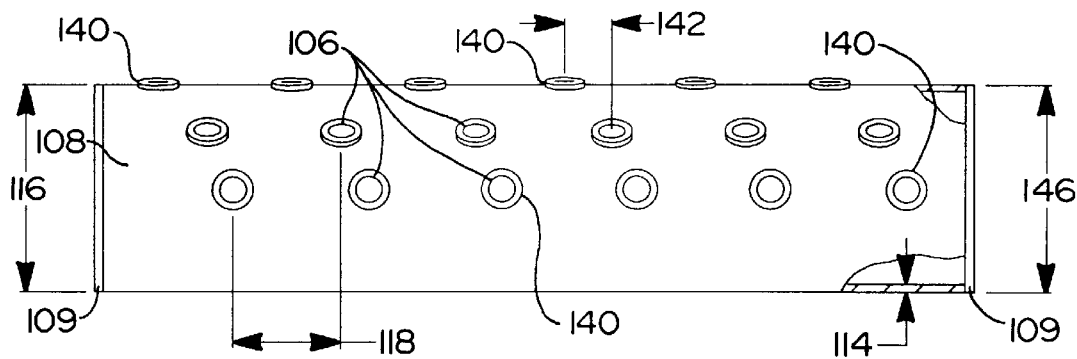

THIN WALL HEADER FOR USE IN MOLTEN SALT SOLAR ABSORPTION PANELS

TECHNICAL FIELD

This invention relates to the design, construction and material of headers, and more particularly to the design, construction and material of a header used to manifold the solar absorption tubes of a solar absorption panel in a molten nitrate salt solar central receiver.

BACKGROUND OF THE INVENTION

Previously employed molten nitrate salt solar receiver panels have used nozzles or tubes that are corner or socket welded directly to a header wall. This type of construction subjects the weld to very high, unacceptable thermal strains which are located near the edge of the opening in the header. Attempts to avoid placing the weld near the highest thermal strain region have involved using a machined nozzle which is insert welded into the header wall to locate the weld away from the highest thermal strain region. Also, tube nozzles that are located at low header flow regions required thermal sleeves or other thermal transient protection approaches to mitigate the severe thermal strains at the tube nozzle-to-header wall junction. These thermal strains are caused by the rapid temperature changes in the molten salt fluid flowing through the header due to cloud passage over a solar plant's heliostat field. Providing this thermal protection has resulted in significant cost increases and complexity in fabrication and inspection of header assemblies used with molten nitrate salt solar receiver panels. Without this additional thermal protection, unacceptably short operational lifetimes will be experienced with header assemblies used in molten nitrate salt solar receiver panels.

Previous approaches to header design have also been predicated upon the use of either 316 or 304 stainless steel or Incoloy 800 for the solar absorption panel header. Although these materials have good molten nitrate salt corrosion resistance up to about 600° C., their high thermal expansion coefficient, relatively low strength and moderate thermal strain fatigue resistance results in the need to provide thermal protection at the important nozzle-to-header region to meet the numerous, severe thermal transient cycles experienced by the header assembly during cloud cover motion over a heliostat field.

It is therefore a principal object of the present invention to provide a header assembly suited for use in a molten nitrate salt solar receiver panel which even more effectively deals with the thermal strains experienced at the header-to-nozzle junction area without the use of complex and expensive thermal protection devices.

It is another object of the present invention to provide a header assembly for use in a molten nitrate salt solar receiver panel which includes a thin wall small diameter header whose nozzles better thermally match the thin receiver tubes attached to the header at these nozzles, and where the header has a low thermal expansion coefficient which yields lower thermal strains in the tube nozzle-to-header region than previously developed header assemblies.

It is still another object of the present invention to provide a header assembly having a construction material that is readily weldable, formable and ASME (American Society of Mechanical Engineers), Boiler and Pressure Vessel Code (ASME Code) approved.

SUMMARY OF THE INVENTION

The above and other objects are provided by a thin wall small diameter header assembly. The header assembly incorporates extruded or machined insert-welded nozzles constructed from a nickel-based superalloy for the distribution and collection of fluid flow to and from the solar absorption tubes of a molten nitrate salt solar absorption panel in a solar central receiver. In one preferred form, the header assembly comprises a header body and a plurality of nozzles which are manufactured from low cycle fatigue alloy 625. A plurality of flow tubes are coupled to the nozzles and in flow communication with the header body.

The use of low cycle fatigue alloy 625 as a material for the header body and nozzles allows a very thin wall header to be constructed which thermally matches the thin receiver tubes and which has a low thermal expansion coefficient. This construction thus yields very low thermal strains in the nozzle-to-header region of the header assembly. The combination of design and material used in the construction of the header assembly of the present invention results in a low cost, reliable header assembly having excellent resistance to both thermal fatigue induced cracking and chloride stress corrosion cracking without the need to utilize costly and complex thermal protection devices for the flow nozzles.

BRIEF DESCRIPTION OF THE DRAWINGS

The various advantages of the present invention will become apparent to one skilled in the art by reading the following specification and subjoined claims and by referencing the following drawings in which:

FIG. 2 is a plan view of the header assembly shown in FIG. 1;

FIG. 3 is a side view of the header assembly of FIG. 2 illustrating tube nozzles of the header body;

FIG. 4 is a side view of the header assembly of FIG. 3 in accordance with directional arrow 4 in FIG. 3;

FIG. 5 is a cross sectional end view of the header body taken in accordance with section line 5—5 in FIG. 3;

DETAILED DESCRIPTION OF THE PREFERRED EMBODIMENTS

Figure 1:
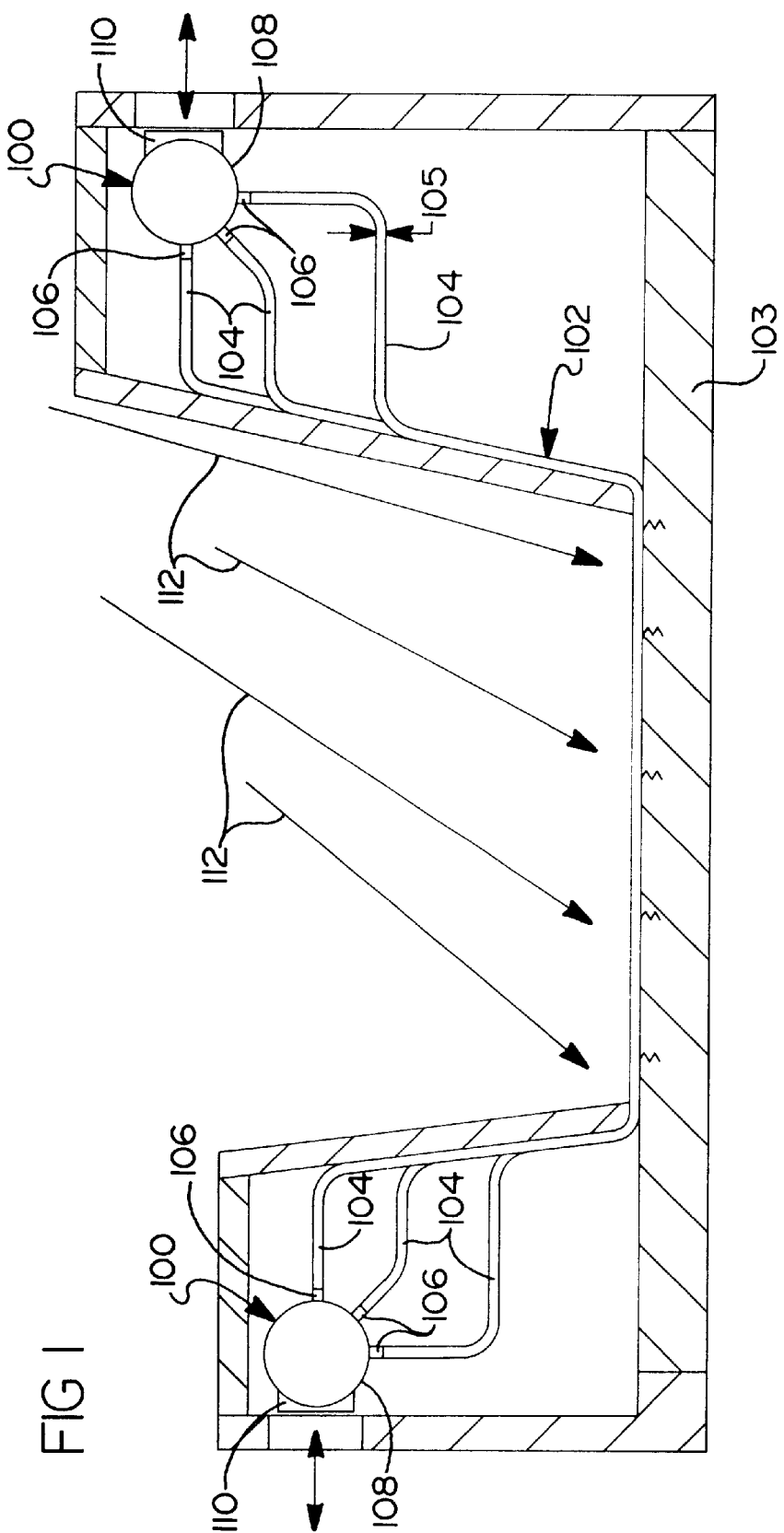
FIG. 1 is a simplified side cross sectional view of an insulated solar absorption panel incorporating a header assembly in accordance with a preferred embodiment of the present invention.

FIG. 1 shows a side view of a header assembly 100 in accordance with a preferred embodiment of the present invention disposed within a solar absorption panel 102. The solar absorption panel 102 is comprised of an array of parallel solar absorption flow tubes 104 secured to tube nozzles 106 of a header body 108. The header assembly 100 is comprised of a header body 108 and end caps 109 which are shown in FIGS. 2, 3 and 4. Preferably, the flow tubes 104 are butt welded to the tube nozzles 106. Molten salt heat transfer fluid enters or exits the solar absorption panel 102 through inlet/outlet nozzles 110 in the header body 108. The molten salt absorbs heat energy from solar radiation 112 reflected onto the tubes by a surround heliostat field (not shown). The header assemblies 100 are used to distribute or collect the heated salt to or from the flow tubes 104. A potential use for this invention together with a detailed description of the nickel-base superalloy, or low cycle fatigue alloy 625 (INCONEL alloy 625 LCF) are contained in U.S. Pat. No. 5,862,800, the disclosure of which is hereby incorporated by reference in its entirety, as if fully set forth herein. The solar absorption panel is completely thermally insulated 103 except in regions where the solar radiation 112 impinges on the tubes 104.

The nickel-based superalloy, or low cycle fatigue alloy 625, is also described in UNS N06626, ASTM B 443, ASME SB-443, SAE AMS 5599, 5879, BS 3072 (NA21), and INCONEL Filler Metal 625. Compared to the chemical composition for standard 625 alloy, the carbon silicon, and nitrogen contents are controlled at low levels to produce a microstructure that enhances low cycle fatigue strength. The compositional control, combined with vacuum induction melting and other processing, yields a dramatic increase in low cycle fatigue strength over the standard 625 alloy produced with usual chemical analyses and processing.

In an embodiment of the invention, the low cycle fatigue alloy is characterized by (i) enhanced fatigue properties as well as (ii) tensile properties and (iii) structural stability. The low cycle fatigue alloy 625 consists essentially of 6 to 12% molybdenum, 19 to 27% chromium, 2 to 5% niobium, up to 8% tungsten, up to 0.6% aluminum, up to 0.6% titanium, carbon present in an amount up to 0.03%, nitrogen present up to 0.03%, silicon up to 0.35%. The carbon, nitrogen, and silicon being correlated such that the sum of %carbon+% nitrogen+1/10% silicon is less than about 0.035%. The low cycle fatigue alloy 625 has up to 5% iron, with the balance being nickel.

In another embodiment of the invention, the low cycle fatigue alloy 625 is characterized by enhanced fatigue properties together with good tensile properties and structural stability consisting essentially of from 30 to 70% nickel, 12 to 30% chromium, up to 10% molybdenum, up to 8% tungsten, up to 15% cobalt, up to 5% niobium, and/or tantalum, titanium plug aluminum up to 5%. The low cycle fatigue alloy 625 having carbon, nitrogen present and silicon in correlated percentages such that the %carbon+% nitrogen+1/10% silicon is less than about 0.04% to thereby improve low cycle and thermal fatigue strength. The balance of the low cycle fatigue alloy 625 being from 0 to 50% iron.

In yet another embodiment of the invention, the low cycle fatigue alloy 625 has limiting chemical compositions of nickel being a minimum of 58.0%, chromium being between 20.0 and 23.0%, molybdenum being between 8.0 and 10.0%, niobium plus tantalum being between 3.15 and 4.15%, iron being a maximum of 5.0%, carbon being a maximum of 0.03%, silicon being a maximum of 0.15%, nitrogen at 0.02% maximum, manganese at 0.50% maximum, sulfur at 0.015% maximum, aluminum at 0.40% maximum, titanium at 0.40% maximum, phosphorous at 0.015% maximum, and cobalt at 1.0% maximum.

In yet another embodiment of the invention, the low cycle fatigue alloy 625 is defined by the AMS 5879 standard issued January 1991 and revised January 1996, which is incorporated herein in its entirety. The AMS 5879 standard states that the composition of the low cycle fatigue alloy 625 has a composition of a maximum of 0.03% of carbon, 0.50% of manganese; 0.15% silicon; 0.015% of phosphorus, 0.015% of sulfur, 1.00% of cobalt, 0.40% of titanium, 0.05% of tantalum, 0.40% of aluminum, 5.00% of iron, 0.02% of nitrogen; a range of 20.00% to 23.00% of chromium, 8.00 to 10.00% of molybdenum, and 3.15 to 4.15% of columbium; and the remainder being nickel.

Referring to FIGS. 2–5, portions of the header assembly 100 are illustrated. FIGS. 2–4 show the flat end caps 109 which are welded to the header body 108. The header body 108 is preferably comprised of a low cycle fatigue alloy, such as UNS N06626. This material is highly resistant to thermal-mechanical fatigue cracking and chloride stress corrosion cracking. It also has a high allowable tensile stress, low coefficient of thermal expansion, acceptable thermal conductivity, high creep strength and low corrosion rates when exposed to molten sodium-potassium nitrate salt at temperatures exceeding 600° C. The inlet/outlet nozzles 110 are preferably extruded directly from the material of the header body 108. Tube nozzles 106 may also be extruded directly from the wall material of the header body 108 or may be independently formed as machined nozzles which are subsequently insert welded into the header body 108 at openings formed in the header body. The wall thickness of the material used to form the header body 108, indicated by arrows 114 in FIG. 4, is selected by providing a thermal strain within the fatigue allowable of the header wall material, in this instance low cycle fatigue alloy, for the imposed magnitude and number of transient cycles caused by cloud cover passage over the heliostat field of the plant where the header assembly 100 is employed. The relatively small diameter of the header body 108, as indicated by arrow 116 in FIG. 4, is set to provide the thin wall thickness (i.e., that thickness defined by arrows 114) which includes the inherent nozzle opening reinforcement for the imposed fluid pressure at the allowable stress for UNS N06626. The excellent physical and mechanical property attributes of UNS N06626, combined with its ASME Code acceptance, is a principal factor that provides the header assembly 100 of the present invention with the ability to cope with the severe thermal strains experienced at the low header flow regions 140 during cloud cover passage over the heliostat field where the header assembly 100 is employed.

A key function of the header assembly 100 is to provide for uniform flow distribution to the flow tubes 104 (FIG. 1) at minimum pressure loss. Several factors need to be considered to provide a uniform flow distribution at minimum pressure loss. Initially, the inlet/outlet nozzle 110 flow area should be at least equal to the flow area of the number of tubes 104 feeding nozzle 110. In the embodiment shown in FIGS. 2–5, merely by way of example, this would require the flow area of each inlet/outlet nozzle 110 to be equal to the total cross-sectional flow area of nine of the flow tubes 104. Also, the cross-sectional flow area set by inside diameter 146 of the header body 108 in FIG. 4 should be set to at least three times the flow area of one-half the number of tube nozzles 106 that are feeding the header body at each inlet/outlet nozzle 110. In the exemplary embodiment of FIGS. 2–5, this would require the cross-sectional flow area of the header body 108 to be at least three times the total flow area of 4.5 flow tubes 104. The inlet/outlet nozzle 110 outside diameter shall be smaller than the header body 108 outside diameter to avoid nozzle opening reinforcement area overlap between the inlet/outlet nozzle 110 and tube nozzles 106 and to make fabrication of the nozzles 110 and 106 by extrusion more practical. In the exemplary embodiment of FIGS. 2–5, one nominal pipe size (NPS) smaller, i.e. 8 inch NPS diameter 111 for the inlet/outlet nozzle 110 at a 10 inch NPS diameter 116 for the header body 108 was found acceptable. The number of inlet/outlet nozzles 110 necessary to achieve the header body 108 diameter required for uniform flow distribution, good constructability and minimum wall thickness 114 is obtained by using the above-described dimensional parameters.

The reliability of the solar absorption panel 102 is enhanced by butt welding the flow tubes 104 to their respective nozzles 106 with an automatic orbital butt welding head. To provide enough space for access to all flow tubes 104, the dimension represented by arrow 118 in FIG. 4 should be at least about three inches (7.62 cm). This sets the number of flow tubes 104 in a pattern dependent upon their outside diameter 105. In the drawings of FIGS. 3–5 this comprises a pattern of three flow tube nozzles 106 with each flow tube nozzle 106 being approximately 1.5 inches (3.81 cm) in diameter 130. The flow tube nozzles 106 are spaced a distance 142 apart as shown in FIG. 4 to provide lateral clearance for thermal growth while minimizing the solar radiation 112 spillage or loss between tubes 104. This distance 142 is set by adding an allowance for tube growth at the maximum operating temperature plus an uncertainty margin of 150° C. to the tube diameter 105. If the panel's required tube diameter 105 is large enough to achieve access for welding with only two tubes 104 in a pattern, then the space 118 is set only by the room required for the weld head and can be as small as distance 142. The ASME Code required reinforcement region must not overlap to assure that a minimum header wall thickness is obtained. The flow tube nozzle's 106 circumferential spacing, indicated by arrows 120 in FIG. 5, is established by providing enough clearance for an orbital weld head and assuring that the ASME Code required reinforcement does not overlap.

The inlet/outlet nozzle 110 is formed by an extrusion process and its required area reinforcement does not overlap the flow tube nozzle's 106.

Figure 6:
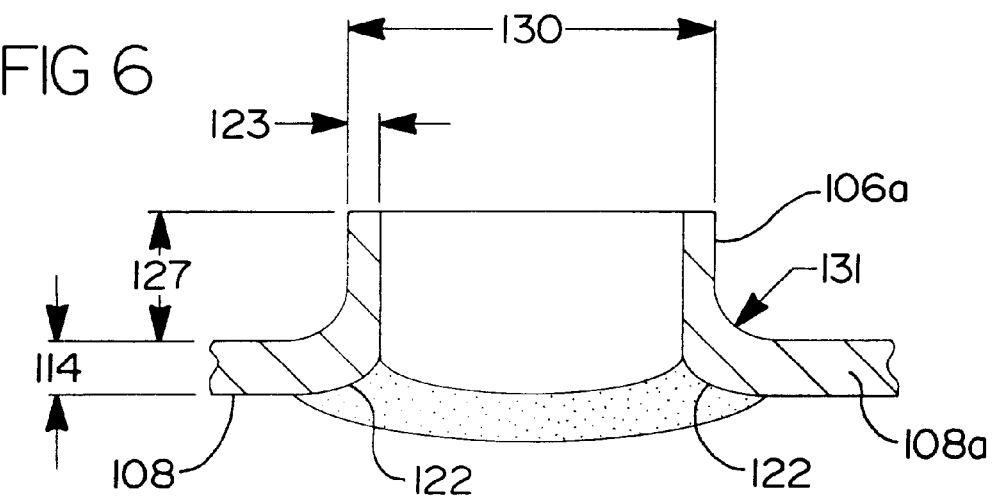
FIG. 6 is a fragmentary, cross sectional side view of the header body of FIG. 1 with a tube nozzle extruded directly from the wall of the header body, in accordance with a first preferred construction of the nozzles.

With reference to FIG. 6, as mentioned previously, each nozzle 106a may be extruded directly from a wall 108a of the header body 108. Such an extruded nozzle 106a is illustrated in FIG. 6. An extruded nozzle eliminates the need for welds at regions 122 where the greatest degree of thermal strain is experienced during periods of rapid cloud cover motion over the heliostat field of a plant where the invention is employed.

For the extruded nozzle 106a of FIG. 6, the extrusion process preferably incorporates an intermediate anneal to eliminate tearing during extrusion. The height, represented by arrow 127, of the nozzle 106a should be the maximum extrudable for the wall thickness 114 of the header body 108a and nozzle diameter 130 to allow for weld head placement to assure a sound tube-to-nozzle butt weld. The nozzle thickness (represented by arrows 123) should be equal to the wall thickness of the flow tube 104.

Figure 7:
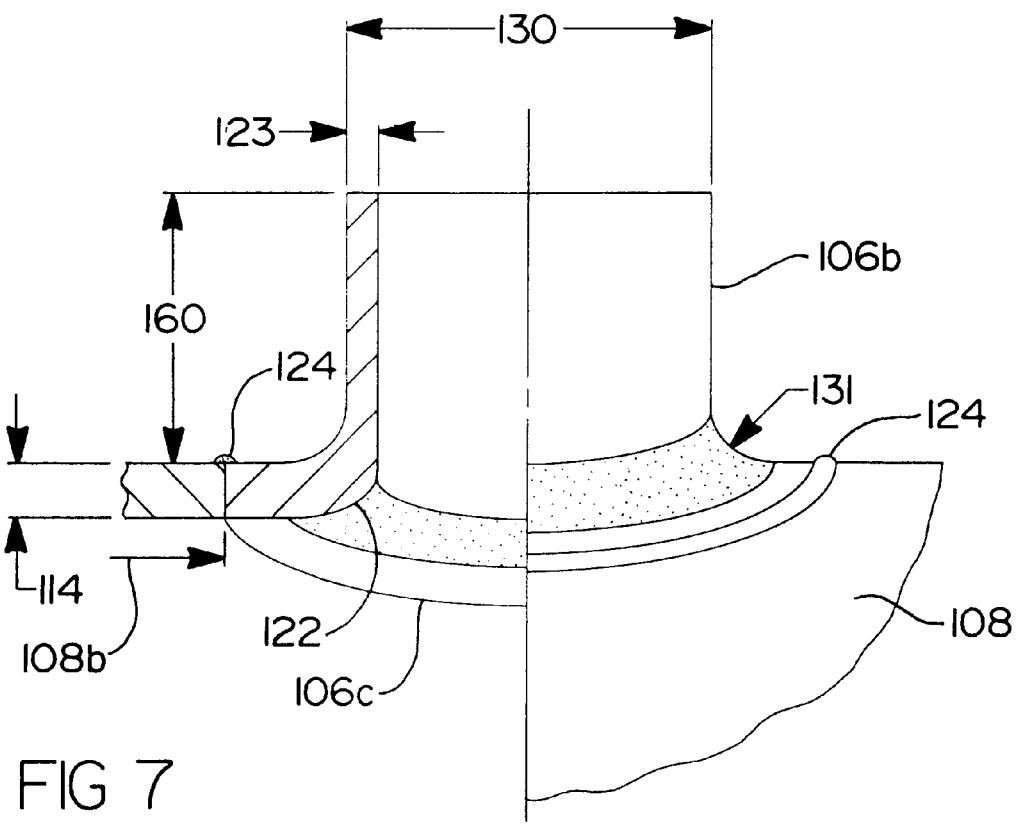
FIG. 7 is a fragmentary, side cross-sectional view of a machined tube nozzle insert welded to the wall of the header body of FIG. 2, in accordance with a second preferred construction of the nozzle.

Referring to FIG. 7, an alternative preferred nozzle 106b is illustrated. Nozzle 106b is an independent, machined component part having a flange 106c. Flange 106c is designed to be insert butt welded into an opening 108b formed in the header body 108. The flange 106c places the weld joint 124 away from the high thermal strain region 122 at the nozzle-to-header interface area.

Based upon analysis and fabrication results, the tube nozzle radius 131 for either nozzle 106a or 106b should be set between 1.0 and 2.0 (preferably 1.5) times the header wall thickness (represented by arrow 114) in FIGS. 4, 6, and 7. The nozzle thickness, represented by arrows 123, should be equal to the wall thickness of the flow tube 104.

The tube nozzle 106b height 160 shown in FIG. 7 should be approximately twice that obtainable for the extruded nozzle 106a height 127 to ease tube to nozzle butt welding. This is readily accomplished for the machined part 106b.

The header assembly 100 of the present invention thus provides a header body 108 with a thin wall which better thermally matches that of the thin wall flow tubes 104 to yield small metal temperature gradients and differentials during cloud cover induced molten salt temperature transients. The header assembly 100, in large part due to the use of UNS N06626 in its construction, experiences significantly lower thermal strains in the tube nozzle-to-header region 122 at low header flow locations 140 than previously developed header assemblies because of the thinner wall and smaller thermal expansion coefficient. This significantly prolongs the life of the header assembly 100 of the present invention over previously developed header assemblies which had no thermal protection devices. It further eliminates the need to furnish these costly and complex thermal protection devices for use with the flow tube nozzles 106 at the low header flow locations 140.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A thin wall, small diameter header for distribution and collection of a molten nitrate salt to and from solar radiation heated tubes, said header comprising:
    a header body comprising a nickel-based superalloy;
    a plurality of tube nozzles extending from said header body and in flow communication with said header body;
    wherein said plurality of tube nozzles couple said header body to the solar radiation heated tubes and flow the molten nitrate salt therethrough;
    wherein said nickel-based supper alloy comprises low cycle fatigue alloy including up to approximately 0.03 percent by weight by carbon; and
    wherein said header body is configured for flow communication with an insulated solar panel in a solar central receiver.

2. The header of claim 1, wherein said tube nozzles comprise machined nozzles insert welded into openings formed in said header body.

3. The header of claim 1, wherein said tube nozzles comprise nozzles extruded from a wall of said header body.

4. A thin wall, small diameter header for a distribution and collection of a molten nitrate salt to and from a molten nitrate salt solar absorption panel's flow tubes in a solar central receiver, said header comprising:
    a header body comprised of a nickel-based superalloy and in flow communication with the molten nitrate absorption panel in the solar central receiver;
    a plurality of tube nozzles extending from and secured into openings in said header body;
    wherein a radius of each said tube nozzle is between about 1.0–2.0 time as large as a wall thickness of said header body;
    wherein said plurality of tube nozzles couple said header body to the flow tubes in the solar central receiver and flow the molten nitrate salt therethrough; and
    wherein said nickel-based super alloy comprises low cycle fatigue alloy including up to approximately 0.03 percent by weight of carbon.

5. The header of claim 4, wherein said radius of said tube nozzle is about 1.5 times as large as said wall thickness of said header body.

6. The header of claim 4, wherein said nozzles comprise machined tube nozzles insert-welded into said openings in said header body.

7. A thin wall header for collecting and distributing a molten nitrate salt to and from parallel flow tubes within a molten nitrate salt solar absorption panel in a solar central receiver, said header comprising:

a header body comprised of a nickel-based super alloy;

a plurality of tube nozzles extending from and in flow communication with openings in said header body; and wherein a radius of each said tube nozzle is between about 1.0–2.0 times as large as a wall thickness of said header body and said plurality of tube nozzles couple said header body to the parallel flow tubes within the molten nitrate salt solar absorption panel in the solar central receiver and said plurality of tube nozzles flow the molten nitrate salt therethrough.

8. The header of claim 7, wherein said tube nozzles are extruded from a wall portion of said header body.

9. The header of claim 7, wherein said header body is comprised of low cycle fatigue alloy including up to approximately 0.03 percent by weight carbon.

10. The header of claim 7, wherein said radius of said tube nozzle is about 1.5 times as large as said wall thickness of said header body.

11. A thin wall small diameter header fabricated from low cycle fatigue alloy having a plurality of inlet/outlet and panel tube nozzles, comprising:

a thin wall header body comprised of the low cycle fatigue alloy and configured for flow communication with an insulated solar panel in a solar central receiver;

said small diameter header body diameter being set to provide said thin wall, including an inherent nozzle opening reinforcement;

wherein said inlet/outlet nozzle being of a number sufficient for said small diameter header body to encompass at least three times an internal flow area of one-half the panel tube nozzles feeding said inlet/outlet nozzle;

wherein an inlet/outlet nozzle flow area is at least equal to an internal flow area of the panel tube nozzles feeding said nozzle;

wherein said inlet/outlet nozzles are formed by extrusion: and wherein said inlet/outlet nozzle diameter is at least one nominal pipe size diameter smaller than said header diameter;

wherein said inlet/outlet nozzle flows a molten nitrate salt therethrough.

12. The header of claim 11, wherein said panel tube nozzles are machined insert-welded into said header.

13. The header of claim 11, wherein said panel tube nozzles are formed by extrusion from said header.

* * * * *